(12) United States Patent
Yukita

(10) Patent No.: US 7,757,174 B2
(45) Date of Patent: Jul. 13, 2010

(54) PROGRAM LIST REPRODUCTION METHOD AND DISPLAY METHOD

(75) Inventor: Yasuhiro Yukita, Kyoto (JP)

(73) Assignee: Panasonic Corporation, Osaka (JP)

( * ) Notice: Subject to any disclaimer, the term of this patent is extended or adjusted under 35 U.S.C. 154(b) by 531 days.

(21) Appl. No.: 11/791,877

(22) PCT Filed: Nov. 28, 2005

(86) PCT No.: PCT/JP2005/021792

§ 371 (c)(1),
(2), (4) Date: May 30, 2007

(87) PCT Pub. No.: WO2006/059563

PCT Pub. Date: Jun. 8, 2006

(65) Prior Publication Data

US 2008/0126976 A1    May 29, 2008

(30) Foreign Application Priority Data

Nov. 30, 2004    (JP) .............................. 2004-345552

(51) Int. Cl.
G06F 3/00 (2006.01)
G06F 3/048 (2006.01)
(52) U.S. Cl. .................. 715/727; 715/716; 715/765; 386/52
(58) Field of Classification Search .......... 715/716, 715/717, 719, 723, 727, 764, 765, 810; 386/46, 386/52, 124
See application file for complete search history.

(56) References Cited

U.S. PATENT DOCUMENTS

| | | | | |
|---|---|---|---|---|
| 6,324,335 B1 * | 11/2001 | Kanda | ......................... | 386/52 |
| 6,526,223 B1 * | 2/2003 | Mori et al. | ................... | 386/96 |
| 7,362,946 B1 * | 4/2008 | Kowald | ...................... | 386/52 |
| 7,486,254 B2 * | 2/2009 | Suzuki et al. | ................ | 345/2.1 |
| 2002/0041752 A1 * | 4/2002 | Abiko et al. | .................. | 386/46 |
| 2003/0012559 A1 | 1/2003 | Kusaka et al. | | |
| 2003/0108338 A1 * | 6/2003 | Nonomura et al. | ............ | 386/95 |
| 2003/0160944 A1 * | 8/2003 | Foote et al. | ................... | 352/1 |

FOREIGN PATENT DOCUMENTS

| | | |
|---|---|---|
| CN | 1364381 A | 8/2002 |
| JP | 64-86364 | 3/1989 |
| JP | 2000-333126 | 11/2000 |
| JP | 2001-257990 | 9/2001 |
| JP | 2005-020202 | 1/2005 |

OTHER PUBLICATIONS

Chinese Office Action, w/ English translation thereof, issued in Chinese Patent Application No. 200580040952.5 dated on Oct. 10, 2008.

* cited by examiner

*Primary Examiner*—X. L Bautista
(74) *Attorney, Agent, or Firm*—McDermott Will & Emery LLP

(57) ABSTRACT

A reproduction list is produced, in which audio data and still image data coexist and a reproduction order thereof is specified. Items of the audio data and the still image data are grouped so as to be associated with each other based on the point of transition between the audio data and the still image data in the reproduction list, and the audio data and the still image data in the same group are reproduced simultaneously.

8 Claims, 23 Drawing Sheets

FIG.3
PRIOR ART

| Reproduction order | Audio |
|---|---|
| 1 | Audio A |
| 2 | Audio B |
| 3 | Audio C |
| 4 | Audio D |

| Display order | Still image | Associated audio | Start timing | Associated audio | End timing | Associated audio |
|---|---|---|---|---|---|---|
| 1 | Still image A | Audio A | Beginning of associated audio | Audio A | End of associated audio | Audio A |
| 2 | Still image B | Audio B | Beginning of associated audio | Audio B | After elapse of slideshow time | Audio B |
| 3 | Still image C | Audio B | After still image B | Audio B | End of associated audio | Audio B |
| 4 | Still image D | Audio C, D | Beginning of associated audio | Audio C, D | End of associated audio | Audio C, D |

Association information

FIG.13
PRIOR ART

Reproduction list

Still imageA
AudioA
Still imageB
Still imageC
AudioB
Still imageD
AudioC
AudioD
Still imageE
Still imageF
AudioE
AudioF
AudioG

PROGRAM LIST REPRODUCTION METHOD AND DISPLAY METHOD

RELATED APPLICATIONS

This application is the U.S. National Phase under 35 U.S.C. §371 of International Application No. PCT/JP2005/021792 filed on Nov. 28, 2005, which in turn claims the benefit of Japanese Application No. 2004-345552, filed on Nov. 30, 2004, the disclosures of which Applications are incorporated by reference herein.

TECHNICAL FIELD

The present invention relates to a reproduction method for performing a reproduction control for simultaneously reproducing audio data and still image data stored in a storage medium, and more specifically to a method for determining the reproduction order of audio data and still image data stored in a storage medium by producing a reproduction list that specifies the reproduction order of the audio data and still image data.

BACKGROUND ART

In recent years, consumer reproduction devices can reproduce a storage medium storing audio data and still image data, which has been recorded on a personal computer, in addition to a storage medium recorded by a dedicated recording device.

For example, it is possible to record, on a personal computer, audio files such as MP3 files and still image files such as JPEG files in a storage medium such as a CD-R/RW or DVD-R/RW/RAM, and reproduce the audio files and still image files by a reproduction device such as a DVD player.

These reproduction devices typically provide reproduction functions such as repeat, random and program, in addition to normal reproduction, and these functions can be used in reproducing audio data or still image data.

A reproduction device for reproducing audio data and still image data will now be described. FIG. 1 shows an audio and still image reproduction device, wherein 11 denotes a storage medium, 12 a storage medium reading device, 13 a data reproduction device, 14 a control device, and 15 a data storage device. Each solid-line arrow in the figure represents the flow of data, and a dotted-line arrow represents the flow of control.

Next, a conventional program list reproduction method for reproducing audio data and still image data on a reproduction device having such a configuration as described above will now be described.

The storage medium 11 stores audio data and still image data, and the basic information of the audio data and still image data are read out by the storage medium reading device 12 and stored in the audio/still image basic information storage area of the data storage device 15. The basic information include data name, data type, address and size.

The user produces an audio reproduction list by arranging data in the order of reproduction while checking the data name in the basic information, and stores the list in the reproduction list storage area of the data storage device 15. Similarly, a still image reproduction list is produced and stored in the reproduction list storage area of the data storage device 15.

Then, when reproducing audio data in the produced reproduction list, the process reproduces the audio data sequentially starting from the top of the list to the last audio data in the list. When reproducing still image data in the produced reproduction list, the process displays the still image data sequentially starting from the top of the list. Each still image is displayed on the screen over a reproduction duration that is stored in the still image reproduction duration storage area.

In a case where the audio and still image reproduction device reproduces a storage medium where audio and still image data are recorded with the reproduction order being preset, a reproduction list is recorded on a storage medium 21 as shown in FIG. 2. The reproduction list is stored in the reproduction list storage area of the data storage device 15, and the control device 14 performs reproduction control for reproducing the audio data and still image data according to the reproduction list.

FIG. 3 shows an example of a reproduction list, including a list representing the reproduction order of audio data, the display order of still image data, and a list representing the association information between the still image data and the audio data such as the display start timing and display end timing of the still image data.

When the reproduction list shown in FIG. 3 is reproduced on a reproduction device, audio is reproduced in the order specified by the audio reproduction list, and still images are displayed at the start timing that is linked with the audio or by the still image display order, as shown in FIG. 4. Then, the display is terminated based on the end timing that is linked with the audio or based on the reproduction duration stored in the still image reproduction duration storage area.

Such a reproduction method with the reproduction list and the association information includes a playlist-based reproduction method for reproducing still images for DVD-Audio (see, for example, Patent Document 1).

Specifically, FIG. 14 shows an example of a reproduction order where a reproduction list as shown in FIG. 13 is reproduced. In the example shown in FIG. 14, still image data and audio data coexist in the reproduction list shown in FIG. 13, and the still image data and the audio data are reproduced in the specified order with no distinction therebetween.

FIG. 15 shows another example of a reproduction order where a reproduction list as shown in FIG. 13 is reproduced. In the example shown in FIG. 15, displayed still image data is not erased when transitioning from the still image data reproduction to the following audio data reproduction.

Patent Document 1: Japanese Laid-Open Patent Publication No. 2000-333126

DISCLOSURE OF THE INVENTION

Problems to be Solved by the Invention

However, with a conventional method for simultaneously reproducing audio data and still image data, it is necessary to add to the reproduction list the association information between audio data and still image data such as the reproduction start timing, the reproduction duration, etc., for producing a reproduction list for simultaneously reproducing audio data and still image data. In a case where such association information is not prepared in advance in the reproduction list, the user needs to specify these association information.

However, the production of a reproduction list in which audio data and still image data are associated with each other is a complicated and time-consuming task, which has been a burden on the user. Moreover, another problem is that many of the reproduction devices commonly available can only produce a reproduction list only of audio data or still image data.

The present invention has been made in view of this problem, and has an object to provide a reproduction control method for reproducing audio data and still image data with association therebetween based on a reproduction list specifying audio data and still image data that is produced by the user, while eliminating the need for the user to add the association information between the audio data and the still image data.

Means for Solving the Problems

In order to achieve the object set forth above, the present invention realizes simultaneous reproduction of audio data and still image data by making two program lists of audio data and still image data into a single list and associating the audio data and the still image data with each other based on the order of the audio data and the still image data.

The present invention provides a program list reproduction method for reproducing still image data and audio data recorded on a storage medium by a predetermined reproduction order, the method including the steps of:

producing a reproduction list specifying the reproduction order of the still image data and the audio data coexisting in the list;

producing a still image reproduction list by sequentially extracting still image data starting from a beginning of the reproduction list and producing an audio reproduction list by sequentially extracting audio data starting from a beginning of the reproduction list; and non-synchronously reproducing the still image data and the audio data based on the still image reproduction list and the audio reproduction list.

Therefore, according to the present invention, it is possible to eliminate the need for information such as the reproduction duration and the reproduction start timing, which are for simultaneously reproducing the audio and still image.

In one embodiment, the present invention may further include the step of resuming reproduction of data from a beginning of one of the still image reproduction list and the audio reproduction list after reproduction of the reproduction list is completed until reproduction of the other one of the still image reproduction list and the audio reproduction list is completed.

Therefore, according to the present invention, it is possible to eliminate the need for association information, which is for reproducing audio and still image simultaneously.

In one embodiment, the present invention provides a program list reproduction method for reproducing still image data and audio data recorded on a storage medium by a predetermined reproduction order, the method including the steps of:

producing a reproduction list specifying the reproduction order of the still image data and the audio data coexisting in the list;

detecting a point of transition from one of the still image data and the audio data in the reproduction list to the other one of the still image data and the audio data, and grouping the still image data and the audio data based on the point of transition; and simultaneously reproducing items of the still image data and the audio data within the same group, among the grouped items of the still image data and the audio data.

Therefore, according to the present invention, it is possible to eliminate the need for association information, which is for reproducing audio and still image simultaneously.

In one embodiment, the present invention may further include the step of setting a reproduction duration of the still image data based on basic information regarding the grouped items of the still image data and the audio data.

Therefore, according to the present invention, it is no longer necessary for the user to specify the reproduction duration or the reproduction start timing.

In one embodiment, the present invention may further include the steps of:

calculating a total reproduction time for audio data within the same group among the grouped items of the still image data and the audio data;

counting a number of still image data items within the group; and setting, as the reproduction duration of the still image data, a value obtained by dividing the calculated total reproduction time for audio data by the number of still image data items.

Therefore, according to the present invention, it is no longer necessary for the user to specify the reproduction duration or the reproduction start timing.

In one embodiment, the present invention provides a program list display method, including the step of displaying on a display screen a group when still image data and audio data are grouped together by using the program list reproduction method.

Therefore, according to the present invention, it is not necessary for the user to specify the association information, which is time-consuming and complicated. Moreover, the user can instantaneously understand the association between the audio and the still image.

In one embodiment, the present invention provides a program list reproduction method, wherein:

movie data is further recorded on the storage medium; and the method further includes the step in which only the movie data is independently assigned a group.

Therefore, according to the present invention, it is possible to produce a program list in which still image data, audio data and movie data coexist, and it is possible to eliminate the need for association information, which is for reproducing still image data simultaneously with audio data, or movie data simultaneously with audio data.

In one embodiment, the present invention may further include the steps of:

determining whether the movie data contains audio; and independently assigning a group to movie data with audio while treating movie data with no audio as is still image data in a grouping process, based on the determination result.

Therefore, according to the present invention, it is possible to produce a program list in which still image data, audio data and movie data coexist, and it is possible to eliminate the need for association information, which is for reproducing still image data simultaneously with audio data, or movie data with no audio simultaneously with audio data.

In one embodiment, the present invention may further include the step of reading in, as a reproduction list, the still image data and the audio data recorded on the storage medium in an order in which the still image data and the audio data are recorded.

Therefore, according to the present invention, it is possible to realize a program reproduction without a program list producing process if the user stores, in advance, items on a storage medium while determining the order of data items in consideration of the program list.

In one embodiment, the present invention may further include the step of reading in, as a reproduction list, a list obtained by rearranging items of the still image data and the audio data recorded on the storage medium by names.

Therefore, according to the present invention, it is possible to realize a program reproduction without a program list producing process if the user stores, in advance, items on a storage medium while determining the names of the data items in consideration of the program list.

Effects of the Invention

With the program list reproduction method for audio data and still image data of the present invention, it is possible to realize a reproduction with association between still images and audio only by producing a single reproduction list, thus providing an effect of improving the operability of the program list reproduction.

BRIEF DESCRIPTION OF THE DRAWINGS

FIG. 3 shows an example of a conventional reproduction list of audio data and still image data.

FIG. 13 shows an example of a conventional reproduction list of audio data and still image data.

DESCRIPTION OF REFERENCE NUMERALS

11 Storage medium
12 Storage medium reading device
13 Data reproduction device
14 Control device
15 Data storage device

BEST MODE FOR CARRYING OUT THE INVENTION

Embodiments of the present invention will now be described in detail with reference to the drawings. The following description of the preferred embodiments is merely illustrative of the present invention, and is in no way intended to limit the scope of the present invention and the applications thereof.

Embodiment 1

Figure 1:
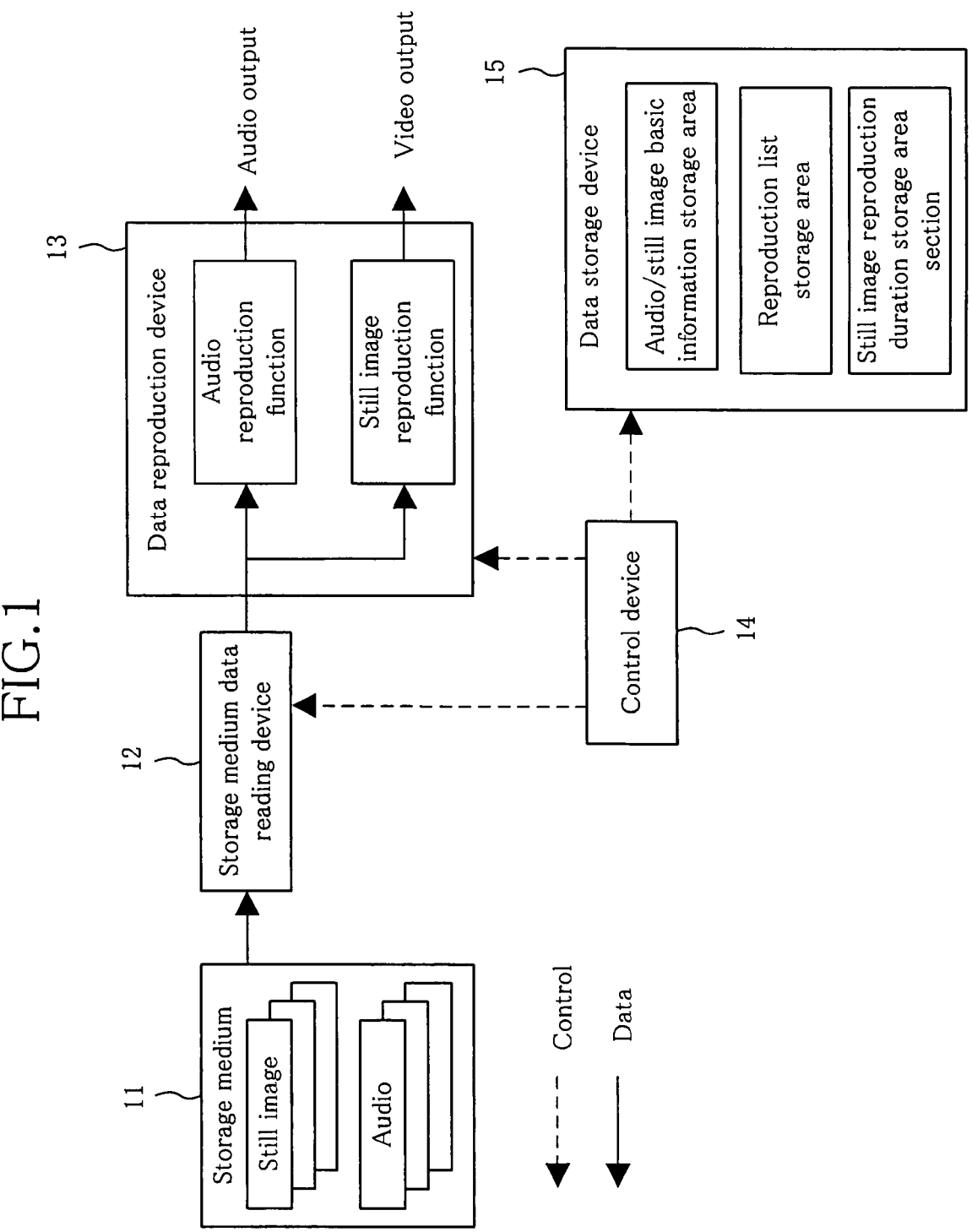
FIG. 1 is a diagram showing a configuration of a reproduction device for reproducing audio data and still image data.
Figure 2:
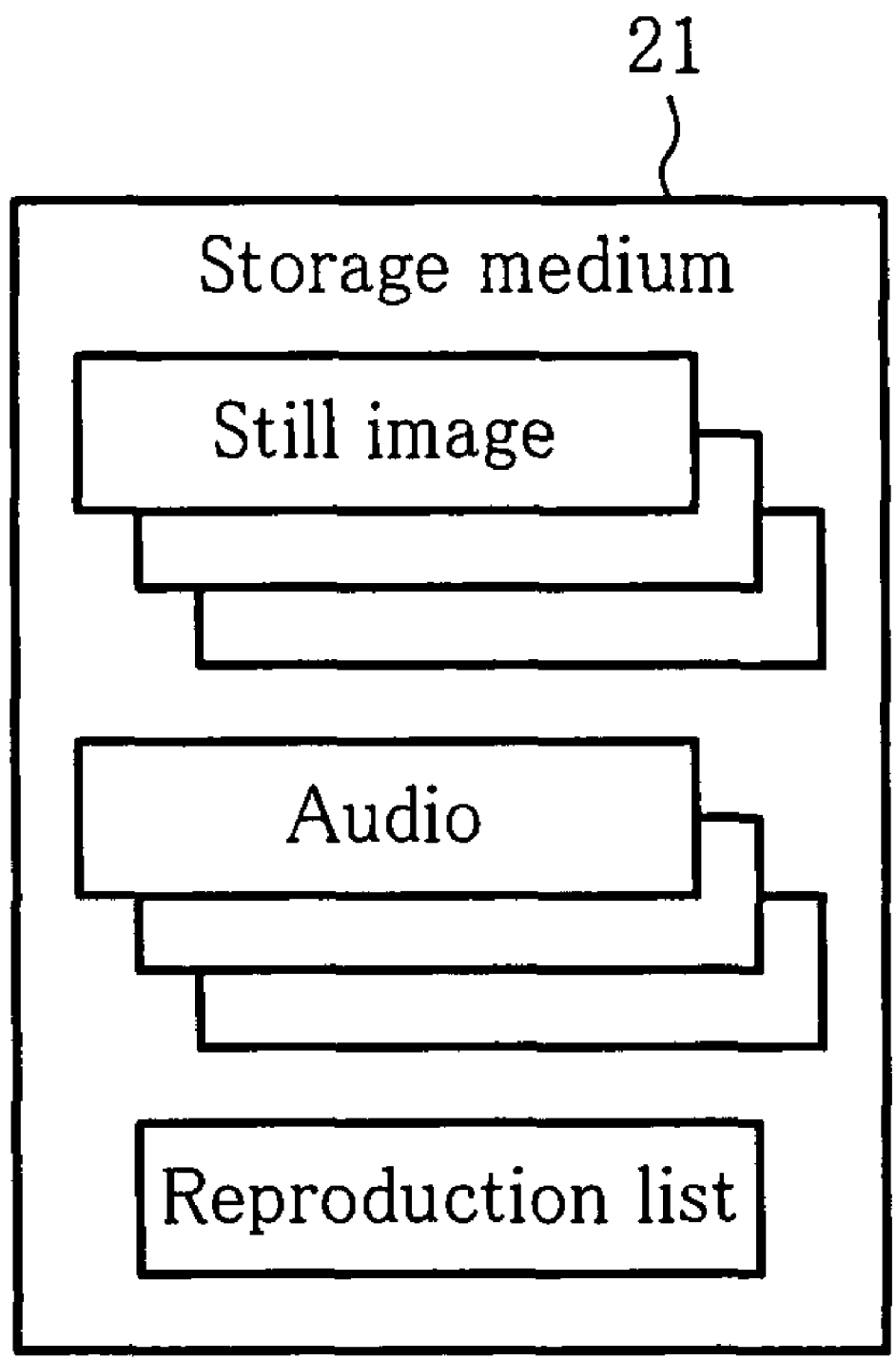
FIG. 2 is a diagram showing a storage medium for storing audio data, still image data and a reproduction list.
Figure 4:
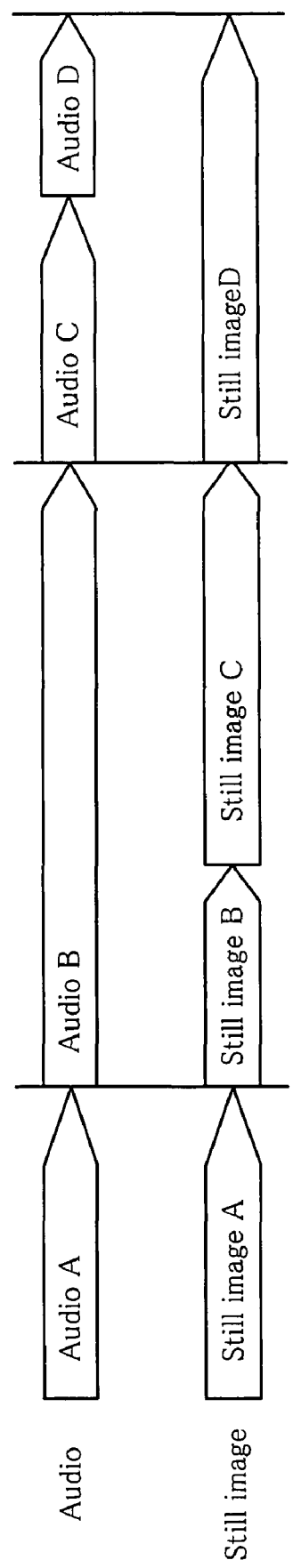
FIG. 4 shows a reproduction example where a conventional reproduction list of audio data and still image data is reproduced.
Figure 5:
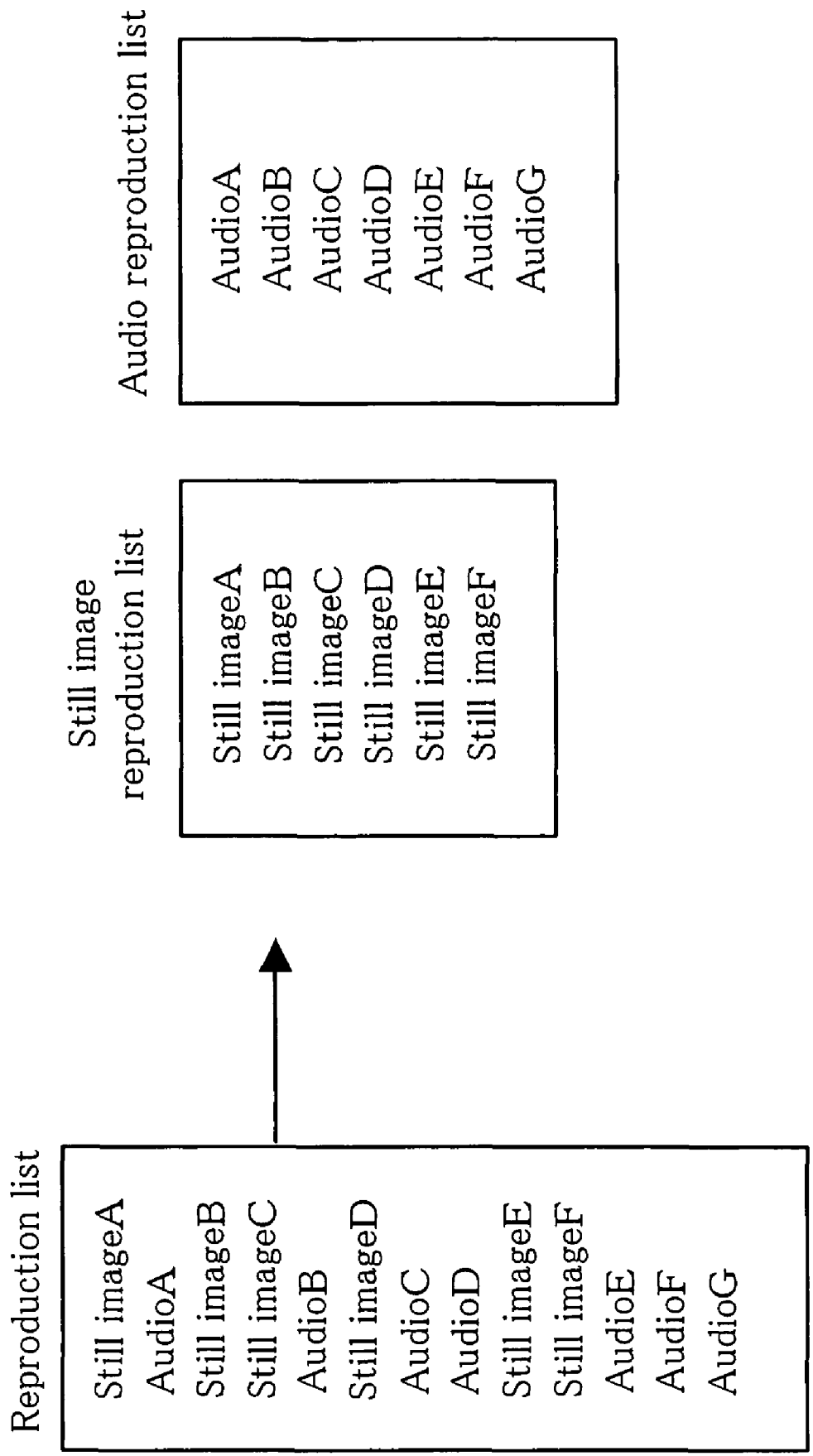
FIG. 5 shows an example of a reproduction list of audio data and still image data according to Embodiment 1 of the present invention.

FIG. 5 shows a reproduction list of audio and still image data to be reproduced by a program list reproduction method according to Embodiment 1 of the present invention. It is assumed herein that the production and reproduction of such a reproduction list are performed on an audio and still image reproduction device as shown in FIG. 1.

First, when performing a program list reproduction of the audio data and still image data stored in the storage medium 11, the user selects, by a remote controller, audio data and still image data to be reproduced from among the plurality of audio data and still image data stored in the storage medium 11.

The selected audio data and still image data are added to the reproduction list in the order they are selected. After the completion of the production of the reproduction list, the reproduction of the reproduction list is started as instructed by the user.

Figure 6:
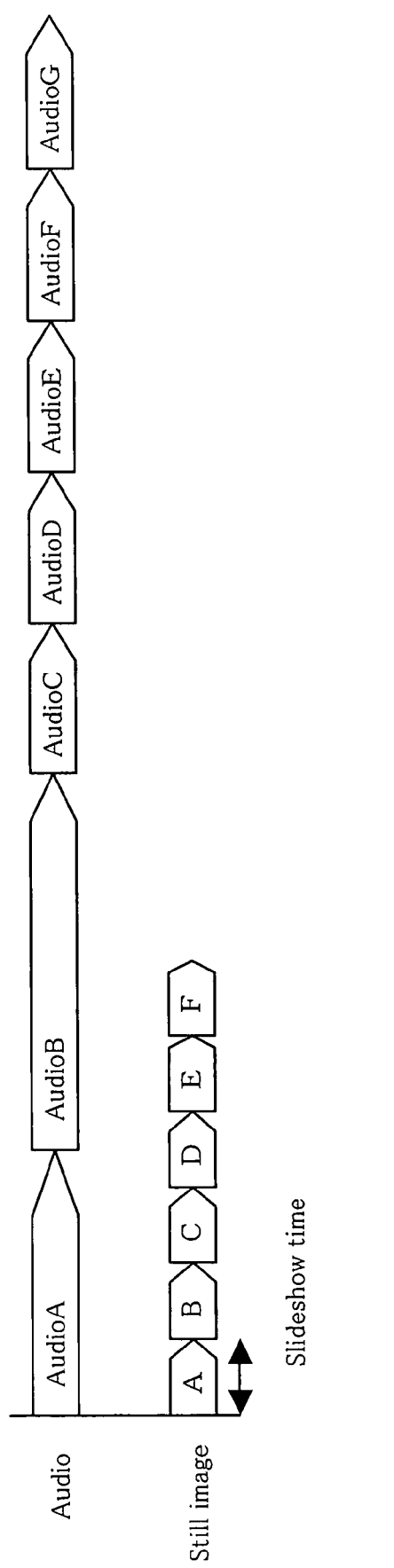
FIG. 6 shows a reproduction example of reproducing audio data and still image data according to Embodiment 1.

As shown in FIG. 5, the audio and the still images of the reproduction list are reproduced non-synchronously as a list only of audio and a list only of still images. The reproduction order in such a case is shown in FIG. 6. It is assumed herein that the still image reproduction duration is set based on the still image reproduction duration stored in the data storage device 15 (see FIG. 1).

Figure 7:
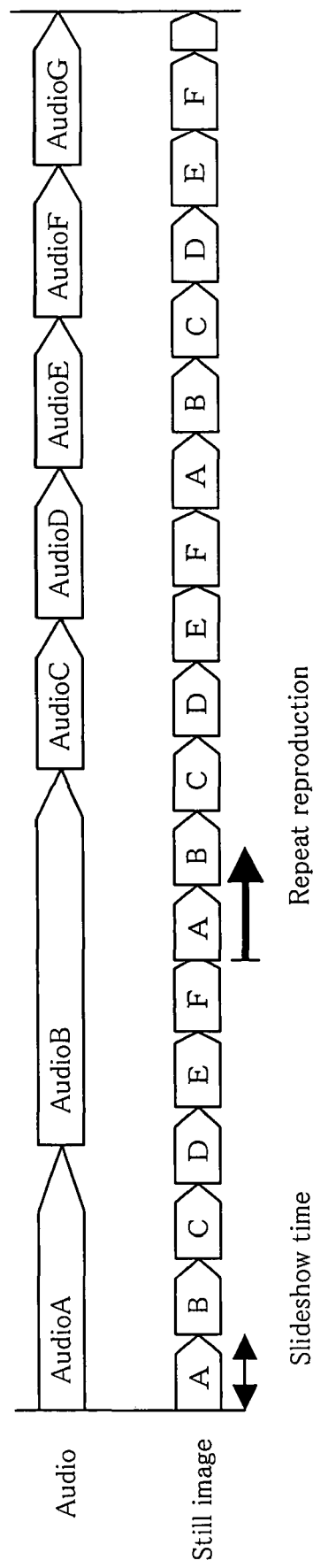
FIG. 7 shows a reproduction example of reproducing audio data and still image data according to Embodiment 1.

When the reproduction of one of the audio reproduction list or the still image reproduction list is completed (the still image reproduction list in the example of FIG. 6) before the other, the reproduced still image reproduction list is reproduced again from the beginning thereof until the reproduction of the other reproduction list (the audio reproduction list in the example of FIG. 6) is completed, as shown in FIG. 7. Then, all the reproductions are stopped when the reproduction of the audio reproduction list, which was not completely reproduced, is completed.

As described above, with the program list reproduction method of Embodiment 1, it is possible to eliminate the need for information such as the reproduction duration and the reproduction start timing, which are for simultaneously reproducing the audio and still image, and it is possible to reduce the burden on the user.

Embodiment 2

A program list reproduction method according to Embodiment 2 of the present invention will now be described. Embodiment 2 is characteristic in that after the user selects, and sequentially adds to the reproduction list, audio data and still image data by using a remote controller, the audio data and the still image data are grouped based on the points of transition in the audio data and the still image data in the reproduction list. The characteristic part will now be described.

Figure 10:
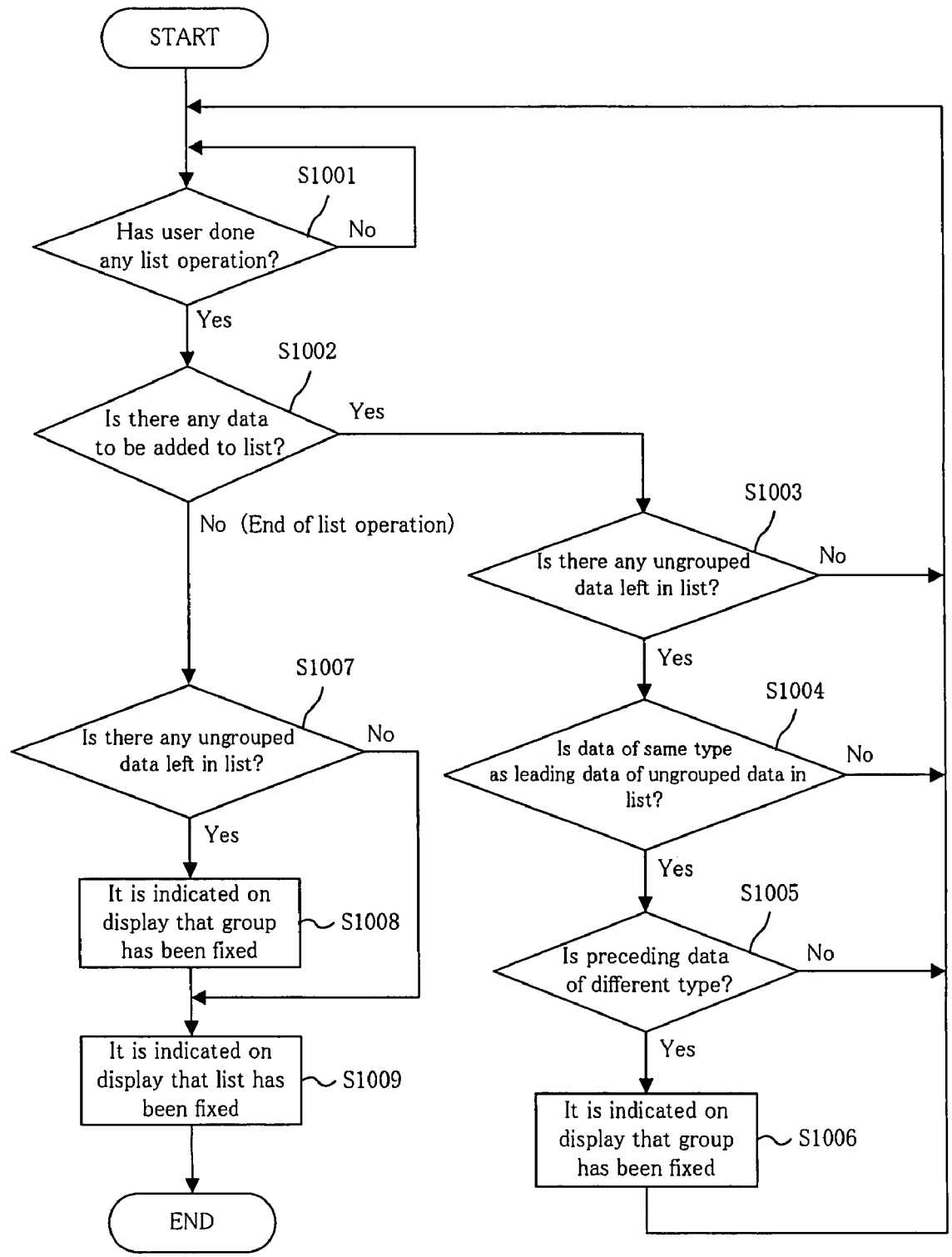
FIG. 10 is a flow chart showing a procedure of producing a reproduction list.

FIG. 10 is a flow chart showing a method for producing a reproduction list and grouping items thereof. As shown in FIG. 10, it is determined in step S1001 whether the user has done any list operation such as an addition to the reproduction list or the completion of the production of the reproduction list. If the determination result is "YES" in step S1001, the process diverges to step S1002. If the determination result is "NO" in step S1001, the process waits until the user does any list operation.

It is determined in step S1002 whether there is any data to be added to the reproduction list. If the determination result is "YES" in step S1002, it is determined that the user's operation is an addition to the reproduction list, and the process diverges to step S1003. If the determination result is "NO" in step S1002, it is determined that the user's operation is the completion of the production of the reproduction list, and the process diverges to step S1007.

It is determined in step S1003 whether there is any data left in the reproduction list that has not been grouped. If the determination result is "YES" in step S1003, the process diverges to step S1004. If the determination result is "NO" in step S1003, the process returns to step S1001.

It is determined in step S1004 whether the data is of the same type as the leading data of the ungrouped data in the reproduction list. If the determination result is "YES" in step S1004, the process diverges to step S1005. If the determination result is "NO" in step S1004, the process returns to step S1001.

It is determined in step S1005 whether data preceding the added data is data of a different type. If the determination result is "YES" in step S1005, it is considered that the point is a point of transition of data, and the process diverges to step S1006. In step S1006, the group is fixed, and it is indicated on the display screen that the group has been fixed. If the determination result is "NO" in step S1005, the process returns to step S1001.

It is determined in step 1007 whether there is any data left in the list that has not been grouped. If the determination result is "YES" in step S1007, the process diverges to step S1008. In step S1008, the group is fixed, and it is indicated on the display screen that the group has been fixed, after which the process proceeds to step S1009. If the determination result is "NO" in step S1007, the process diverges to step S1009. Then, in step S1009, it is indicated on the screen that the list has been fixed.

Figure 11:
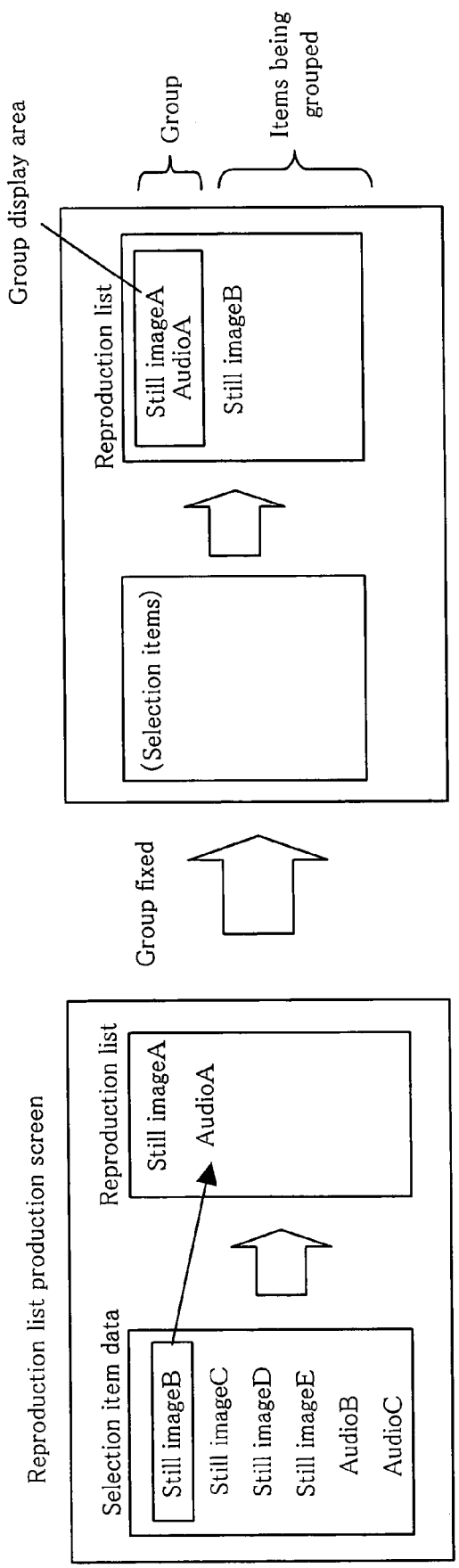
FIG. 11 shows a reproduction list production screen.

FIG. 11 shows an example where a group has been fixed. By adding the still image B from among the selection item data, the still image A and the audio A, which have already been added to the reproduction list, are grouped together. Then, a group display area for displaying grouped data is produced in the display area displaying the reproduction list, and the grouped data are displayed in the group display area (see FIG. 8).

Figure 8:
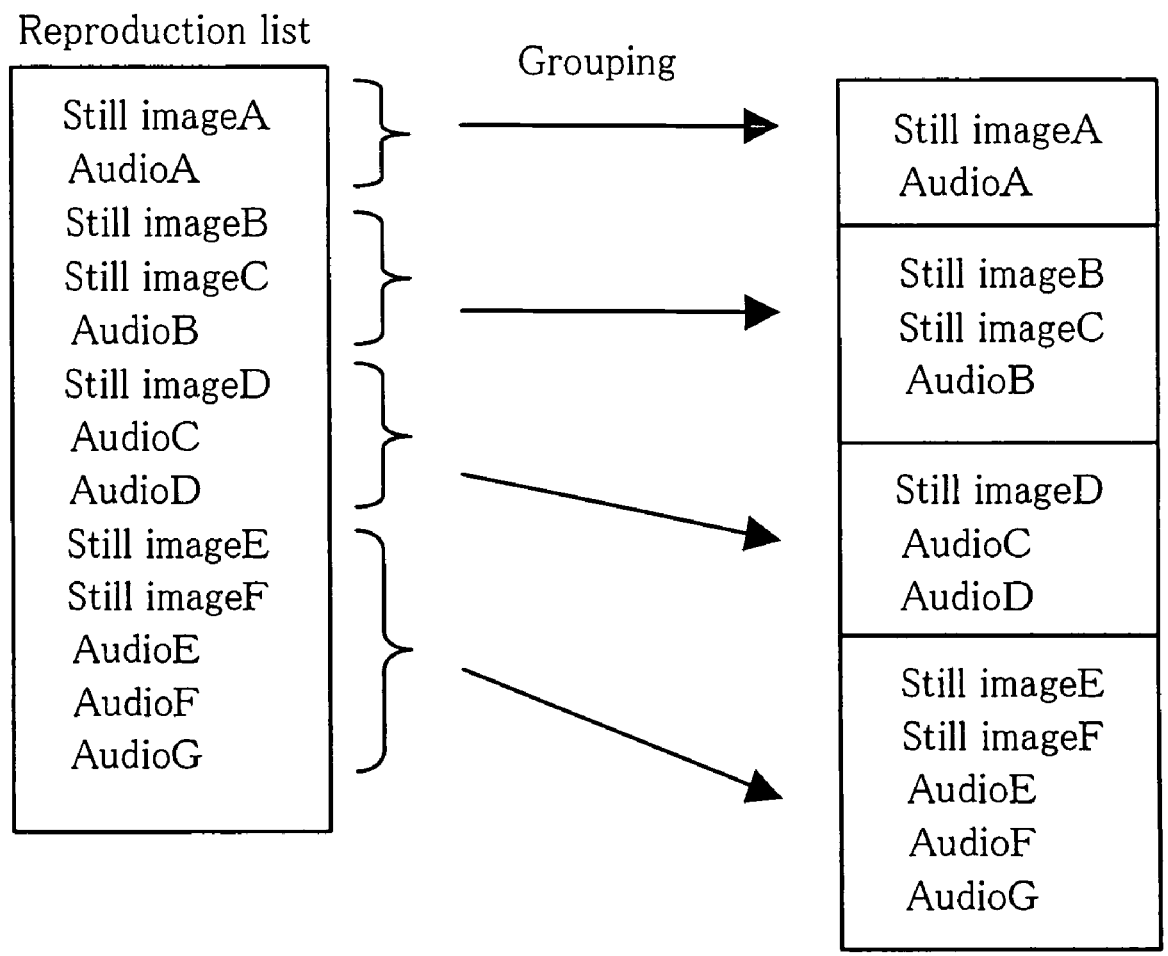
FIG. 8 shows an example of a reproduction list of audio data and still image data according to Embodiment 2.
Figure 9:
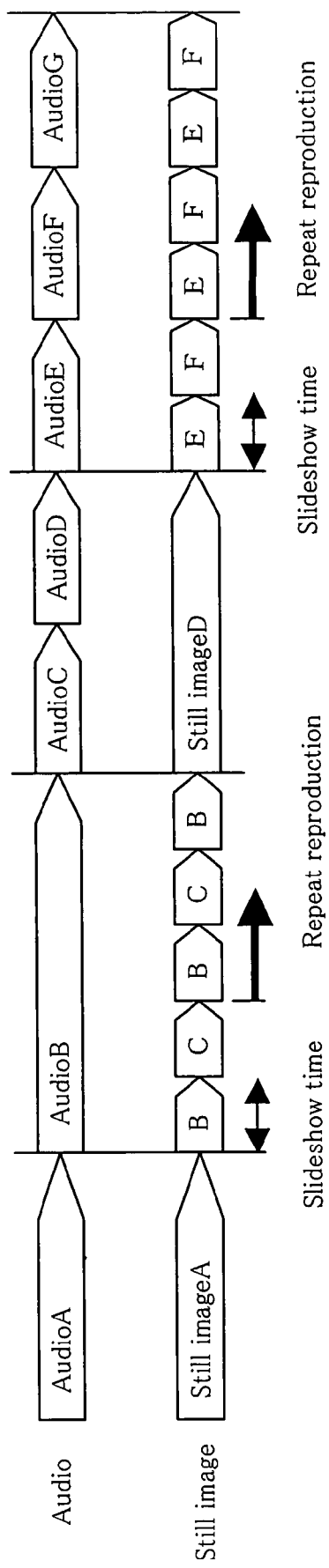
FIG. 9 shows a reproduction example of reproducing audio data and still image data according to Embodiment 2.

FIG. 8 shows an example of the reproduction list, and FIG. 9 shows the reproduction order used when reproducing the reproduction list. The reproduction duration for still images is set based on the still image reproduction duration stored in the data storage device 15 (see FIG. 1).

With such a reproduction list, audio and still images within the same group are reproduced as follows. When the reproduction of the reproduction list has been first completed for either the audio or the still image (the still image in the example of FIG. 9), the reproduction of the still images is resumed starting from the beginning of the reproduction list until the reproduction of the reproduction list is completed for the other one of the audio and the still image (the audio in the example of FIG. 9). Then, when the reproduction of the reproduction list is completed for the audio, which was not completed first, the next group is reproduced. If there is no next group, the reproduction process is terminated.

As described above, with the program list reproduction method of Embodiment 2, it is not necessary for the user to specify the association information, which is time-consuming and complicated. Moreover, how items are grouped is displayed on the screen, whereby the user can instantaneously understand the association between the audio and the still image.

Embodiment 3

A program list reproduction method according to Embodiment 3 of the present invention is basically the same as Embodiment 2 described above, but is different in the method for setting the reproduction duration for grouped still images. Only the method for setting the reproduction duration for still images will be described below.

Figure 12:
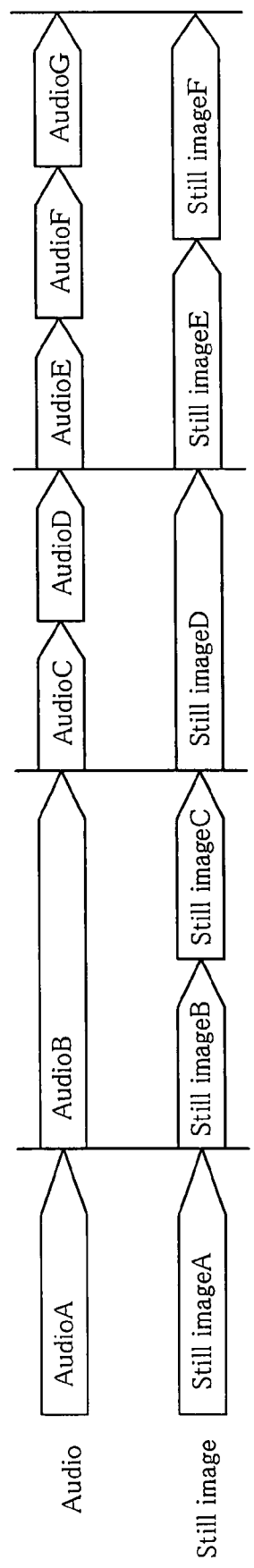
FIG. 12 shows a reproduction example of reproducing audio data and still image data according to Embodiment 3.
Figure 14:
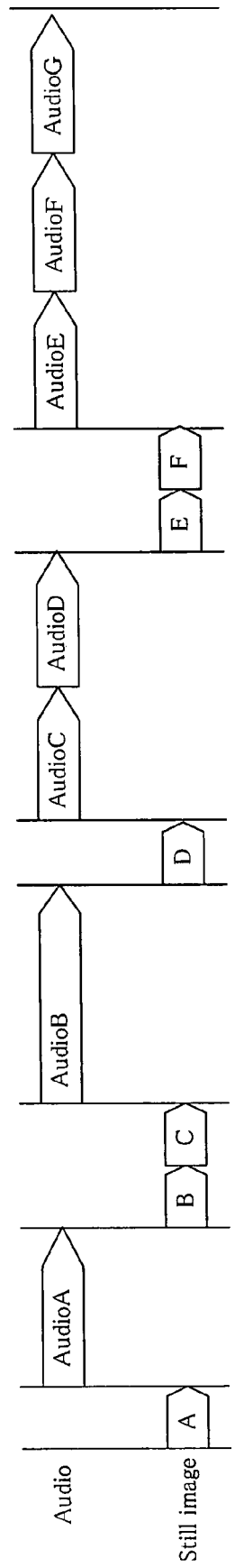
FIG. 14 shows a reproduction example of reproducing a conventional reproduction list of audio data and still image data.
Figure 15:
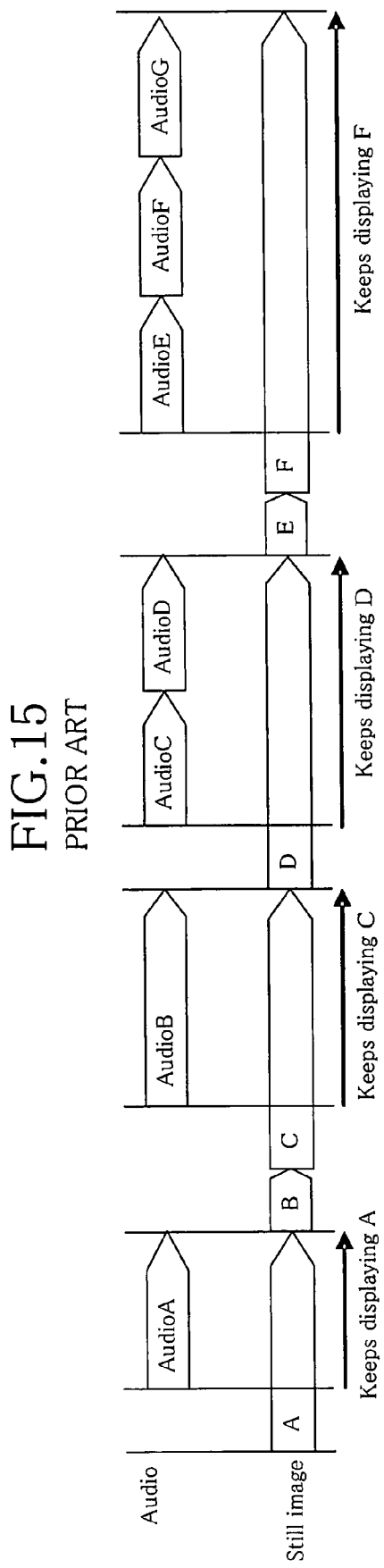
FIG. 15 shows another reproduction example of reproducing a conventional reproduction list of audio data and still image data.

FIG. 12 shows the reproduction order using the program reproduction method of Embodiment 3. As the reproduction list, Embodiment 3 employs a reproduction list shown in FIG. 8.

First, the process calculates the total amount of time for the reproduction of audio data in each group, and the total amount of time is divided by the number of still images in that group. The obtained amount of time is set as the still image reproduction duration, and the reproduction duration is assigned for each still image in the group.

Specifically, when the reproduction list shown in FIG. 8 is reproduced, the list is reproduced as shown in FIG. 12, wherein for the group (the right-most group in the figure) including the audio E, the audio F, the audio G, the still image E and the still image F, for example, the value obtained by dividing the total amount of time of the audio E, audio F and the audio G by the number of still images ("2" in the illustrated example) is assigned as the reproduction duration for each of the still image E and the still image F.

As described above, with the program list reproduction method of Embodiment 3, it is not necessary for the user to specify the reproduction duration or the reproduction start timing, thereby reducing the operation burden on the user.

Embodiment 4

The program list reproduction method of Embodiment 4 of the present invention is basically the same as Embodiment 2 or 3 described above, but is different in the handling of movie data. The method for handling movie data will now be described.

Figure 16:
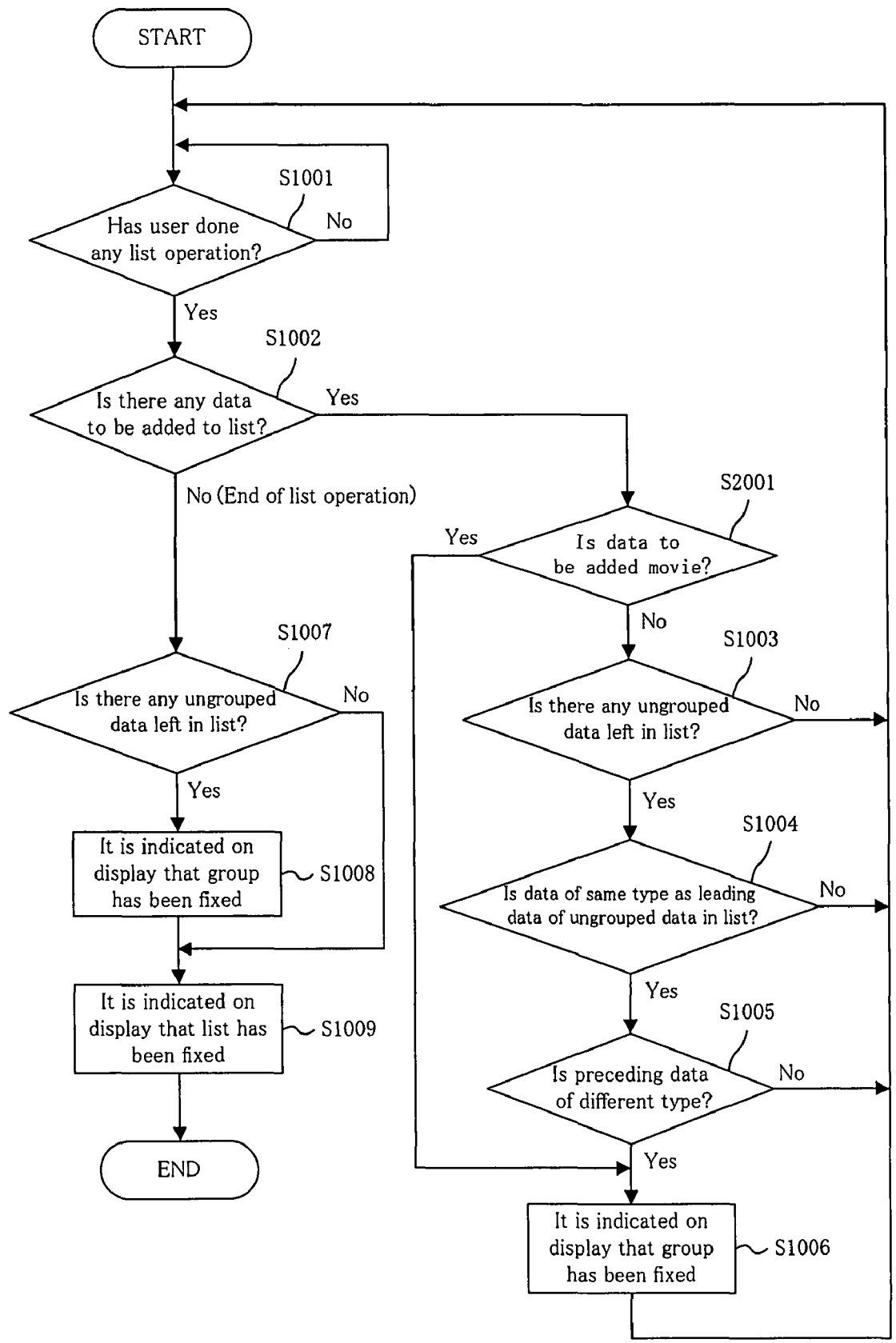
FIG. 16 is a flow chart showing a procedure of producing a reproduction list including a movie data determination process.

FIG. 16 is a flow chart showing a method for producing a reproduction list and grouping items thereof. As shown in FIG. 16, it is determined in step S1002 whether there is data in the reproduction list to be added. If the determination result is "YES" in step S1002, it is determined that the user's operation is the reproduction list addition operation, and the process diverges to step S2001. If the determination result is "NO" in step S1001, the process waits until the user performs a list operation.

It is determined in step S2001 whether data to be added to the reproduction list is movie data. If the determination result is "YES" in step S2001, the process diverges to step S1006 to fix a group in step S1006, and it is indicated on the display screen that the group has been fixed. If the determination result is "NO" in step S2001, the process diverges to step S1003.

It is determined in step S1003 whether there is any data left in the reproduction list that has not been grouped. If the determination result is "YES" in step S1003, the process diverges to step S1004. If the determination result is "NO" in step S1003, the process returns to step S1001.

It is determined in step S1004 whether the data is of the same type as the leading data of the ungrouped data in the reproduction list. It is assumed herein that the still image data and the movie data are determined to be data of the same type. The subsequent steps are the same as those of Embodiment 2 or 3, and will not be described below.

Figure 17:
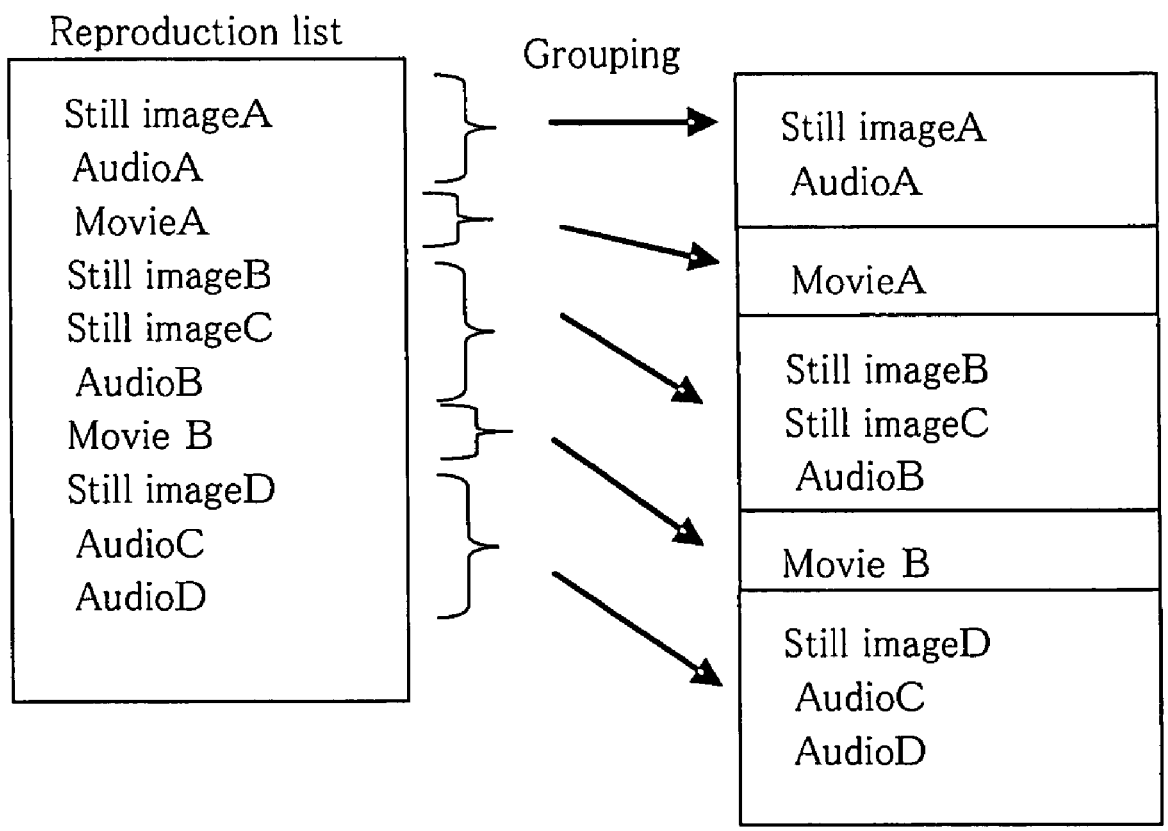
FIG. 17 shows a reproduction list including movie data according to Embodiment 4, and an example of how items thereof are grouped.
Figure 18:
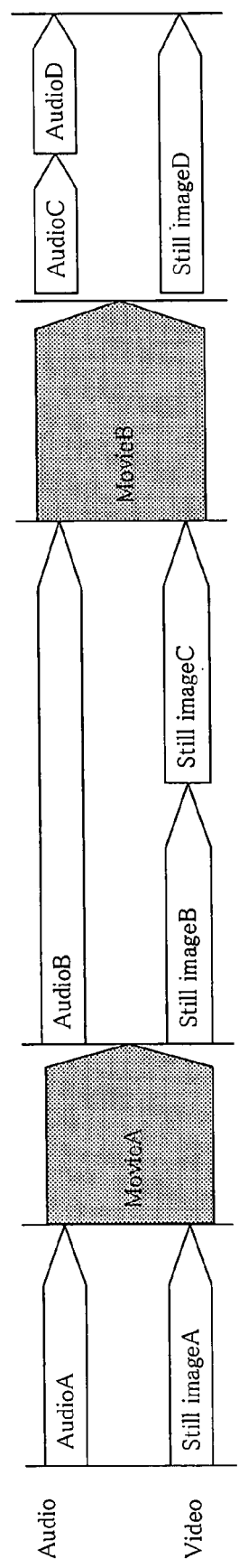
FIG. 18 shows a reproduction example of reproducing a reproduction list including movie data according to Embodiment 4.

FIG. 17 shows an example of a reproduction list including movie data, wherein items are grouped by the reproduction list production procedure described above. FIG. 18 shows the reproduction order used when reproducing the reproduction list.

When items are reproduced based on such a reproduction list, where each movie data is independently assigned a group, any movie portion of the list is reproduced independently and not simultaneously with audio data.

As described above, with the program list reproduction method of Embodiment 4, it is possible to produce a program list in which still image data, audio data and movie data coexist, and it is possible to eliminate the need for association information, which is for reproducing still image data simultaneously with audio data, or movie data simultaneously with audio data.

Embodiment 5

A program list reproduction method according to Embodiment 5 of the present invention is basically the same as Embodiment 4 described above, but is different in the method for obtaining the program list. The method for obtaining the program list will now be described.

Figure 19:
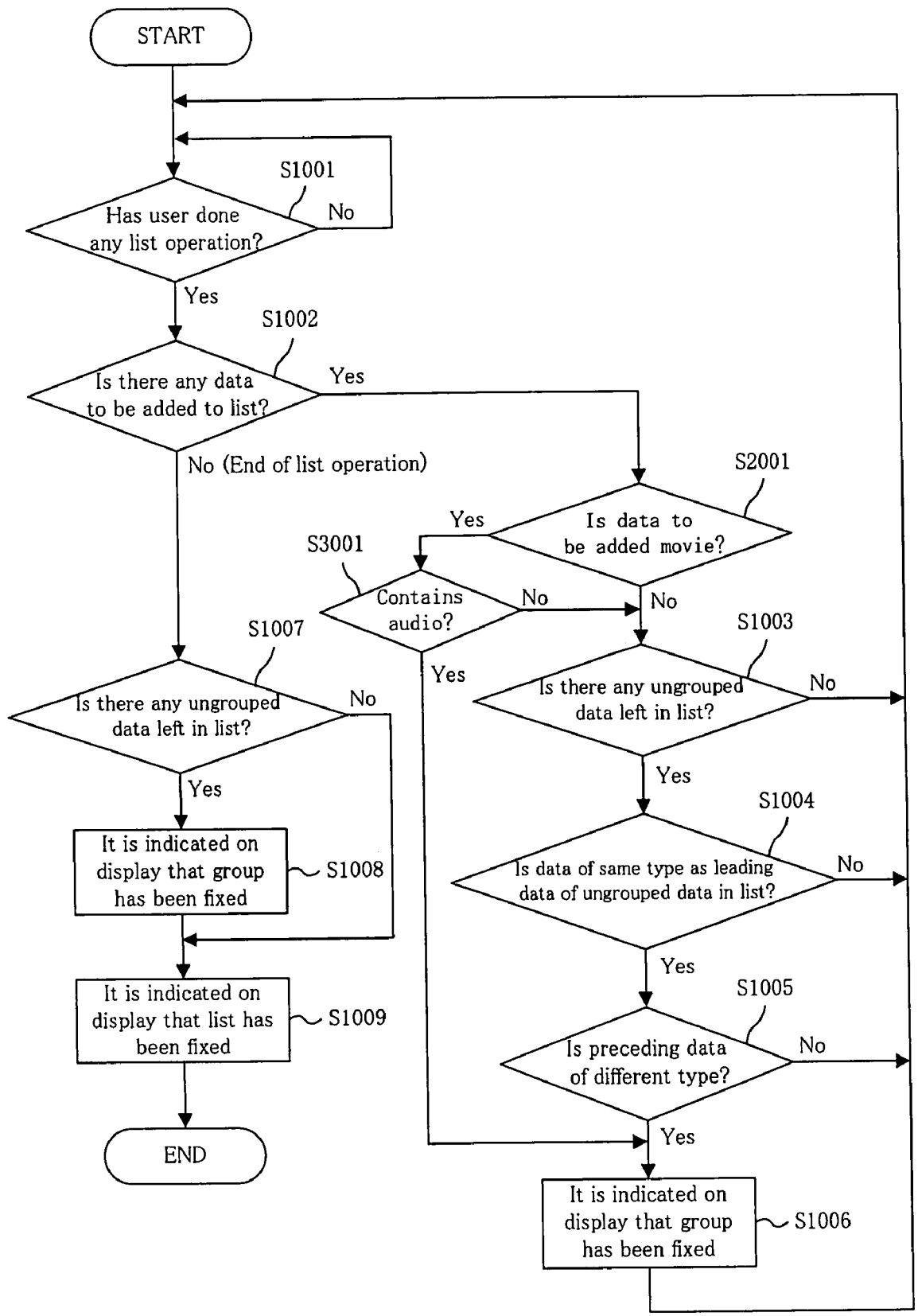
FIG. 19 is a flow chart showing a procedure of producing a reproduction list including a movie data determination process with or without audio.

FIG. 19 is a flow chart showing a method for producing a reproduction list and grouping items thereof. As shown in FIG. 19, it is determined in step S1002 whether there is data in the reproduction list to be added. If the determination result is "YES" in step S1002, it is determined that the user's operation is the reproduction list addition operation, and the process diverges to step S2001. If the determination result is "NO" in step S1001, the process waits until the user performs a list operation.

It is determined in step S2001 whether data to be added to the reproduction list is movie data. If the determination result is "YES" in step S2001, the process diverges to step S3001. If the determination result is "YES" in step S2001, the process diverges to step S1003.

It is determined in step S3001 whether audio is contained in movie data. If the determination result is "YES" in step S3001, the process diverges to step S1006 to fix a group in step S1006, and it is indicated on the display screen that the group has been fixed. If the determination result is "YES" in step S3001, the process diverges to step S1003.

It is determined in step S1003 whether there is any data left in the reproduction list that has not been grouped. If the determination result is "YES" in step S1003, the process diverges to step S1004. If the determination result is "NO" in step S1003, the process returns to step S1001.

It is determined in step S1004 whether the data is of the same type as the leading data of the ungrouped data in the reproduction list. It is assumed herein that the still image data and the movie data are determined to be data of the same type. The subsequent steps are the same as those of Embodiment 4, and will not be described below.

Figure 20:
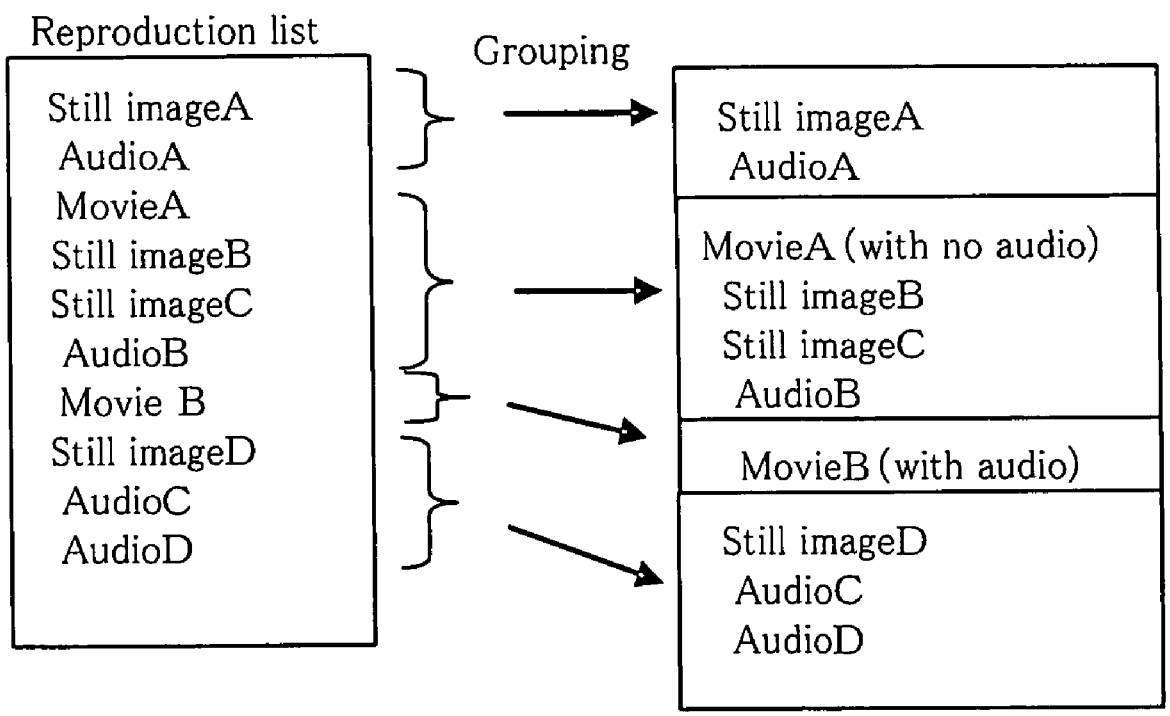
FIG. 20 shows a reproduction list including movie data according to Embodiment 5, and an example of how items thereof are grouped.
Figure 21:
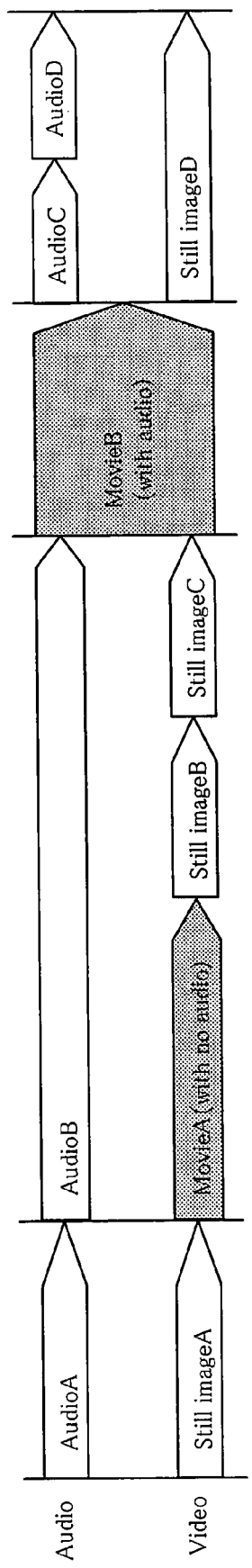
FIG. 21 shows a reproduction example of reproducing a reproduction list including movie data according to Embodiment 5.

FIG. 20 shows an example of a reproduction list including movie data, wherein items are grouped by the reproduction list production procedure described above. FIG. 21 shows the reproduction order used when reproducing the reproduction list.

When items are reproduced based on such a reproduction list, movie data with no audio (the movie A) is handled as is still image data so that audio data is reproduced simultaneously with movie data with no audio.

On the other hand, movie data with audio (the movie B) is independently assigned a group as in Embodiment 4, whereby the movie portion is reproduced independently and not simultaneously with audio data.

Figure 22:
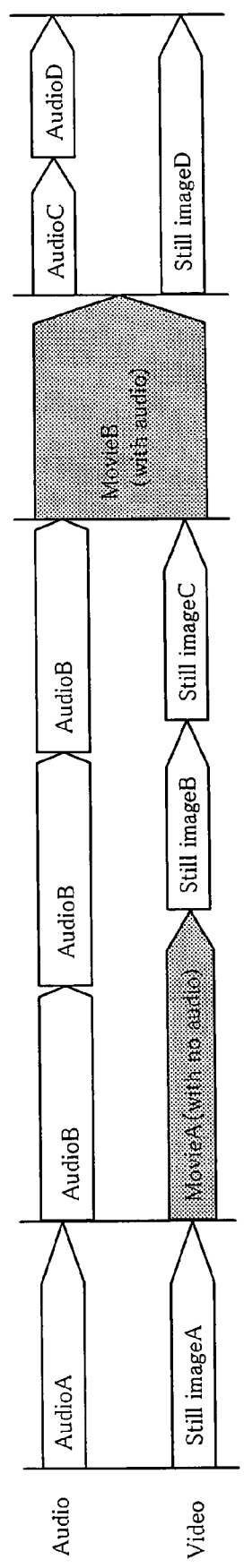
FIG. 22 shows another reproduction example of reproducing a reproduction list including movie data according to Embodiment 5.

FIG. 22 shows another reproduction order for reproducing the reproduction list of FIG. 20. Audio, still images and movie with no audio within the same group are reproduced as follows.

Specifically, in the group including the movie A, the still image B, the still image C and the audio B in the example of FIG. 22, the reproduction of the audio B is completed before the reproduction of the movie A, the still image B and the still image C is completed. Until the reproduction of the movie A, the still image B and the still image C is completed, the reproduction is resumed starting from the beginning of the reproduction list of the audio B. Then, when the reproduction of the reproduction list is completed for the movie and still images, which was not completed, the next group is reproduced (the movie B in FIG. 22).

As described above, with the program list reproduction method of Embodiment 5, it is possible to produce a program list in which still image data, audio data and movie data coexist, and it is possible to eliminate the need for association information, which is for reproducing still image data simultaneously with audio data, or movie data with no audio simultaneously with audio data.

Embodiment 6

A program list reproduction method according to Embodiment 6 of the present invention aims at realizing the program reproduction without requiring a program list producing process. A specific program list reproduction method will now be described.

Figure 23:
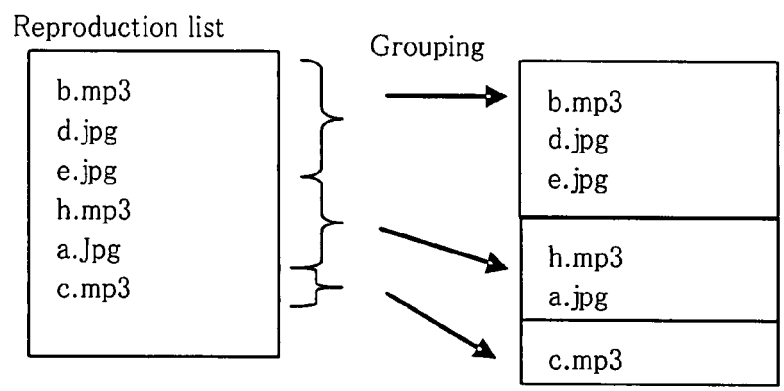
FIG. 23 shows an example of how a reproduction list is read in and grouped according to Embodiment 6.

FIG. 23 shows an example of the order in which audio data and still image data are recorded on a storage medium and an example of how items are grouped. As shown in FIG. 23, when grouping audio data and still image data, the order in which they are recorded on a storage medium is read in as the program list.

Specifically, if the audio b, the still image d, the still image e, the audio h, the still image a and the audio c are recorded in this order on the reproduction list, the audio b, the still image d and the still image e are grouped together, and the audio h and the still image a are grouped together, with the audio c independently forming a group according to the order.

Figure 24:
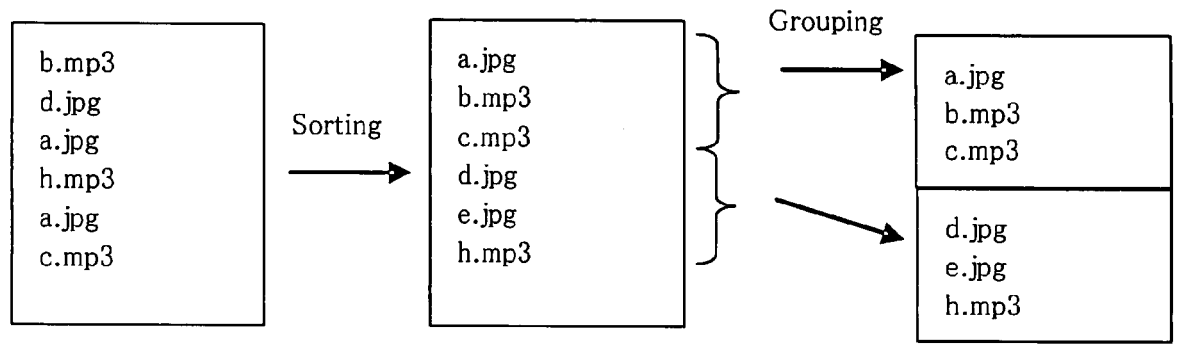
FIG. 24 shows another example of how a reproduction list is read in and grouped according to Embodiment 6.

FIG. 24 shows another example of the order in which audio data and still image data are recorded on a storage medium and how items are grouped. As shown in FIG. 24, for the grouping of audio data and still image data, the process reads in, as the program list, a list obtained by rearranging items, which are in the order in which they are recorded on the storage medium, by names.

Specifically, if the audio b, the still image d, the still image e, the audio h, the still image a and the audio c are recorded in this order on the reproduction list, the data are first sorted by names into the following order: the still image a, the audio b, the audio c, the still image d, the still image e and the audio h. Then, according to this order, the still image a, the audio b and the audio c are grouped together, and the still image d, the still image e and the audio h are grouped together.

As described above, with the program list reproduction method of Embodiment 6, it is possible to realize a program reproduction without a program list producing process if the user stores, in advance, items on a storage medium while determining the order of data items or the names of the data items in consideration of the program list.

INDUSTRIAL APPLICABILITY

The program list reproduction method for audio data and still image data of the present invention is useful as a reproduction method for a recording medium in which association information between audio data and still image data is not added. The storage medium is not limited to any particular type as long as audio data and still image data are recorded thereon, and the present method can also be used as a reproduction method for reproducing items over a plurality of storage media.

The invention claimed is:

1. A program list reproduction method for reproducing still image data and audio data recorded on a storage medium by a predetermined reproduction order, the method comprising the steps of:
   producing a reproduction list specifying the reproduction order of the still image data and the audio data coexisting in the list;
   detecting a point of transition from one of the still image data and the audio data in the reproduction list to the other one of the still image data and the audio data, and grouping the still image data and the audio data based on the point of transition; and
   simultaneously reproducing items of the still image data and the audio data within the same group, among the grouped items of the still image data and the audio data.

2. The program list reproduction method of claim 1, further comprising the step of setting a reproduction duration of the still image data based on basic information regarding the grouped items of the still image data and the audio data.

3. The program list reproduction method of claim 1, further comprising the steps of
   calculating a total reproduction time for audio data within the same group among the grouped items of the still image data and the audio data;
   counting a number of still image data items within the group; and
   setting, as the reproduction duration of the still image data, a value obtained by dividing the calculated total reproduction time for audio data by the number of still image data items.

4. A program list display method, comprising the step of displaying on a display screen a group when still image data and audio data are grouped together by using the program list reproduction method of claim 1.

5. The program list reproduction method of claim 1, wherein:
   movie data is further recorded on the storage medium; and
   the method further comprises the step in which only the movie data is independently assigned a group.

6. The program list reproduction method of claim 5, further comprising the steps of:
   determining whether the movie data contains audio; and
   independently assigning a group to movie data with audio while treating movie data with no audio as is still image data in a grouping process, based on the determination result.

7. The program list reproduction method of claim 1, further comprising the step of reading in, as a reproduction list, the still image data and the audio data recorded on the storage medium in an order in which the still image data and the audio data are recorded.

8. The program list reproduction method of claim 1, further comprising the step of reading in, as a reproduction list, a list obtained by rearranging items of the still image data and the audio data recorded on the storage medium by names.

* * * * *